United States Patent
Molari et al.

(10) Patent No.: US 10,014,780 B2
(45) Date of Patent: Jul. 3, 2018

(54) MULTIPHASE SWITCHING CONVERTER

(71) Applicant: Dialog Semiconductor (UK) Limited, London (GB)

(72) Inventors: Alessandro S. Molari, Munich (DE); Martin Faerber, Munich (DE)

(73) Assignee: Dialog Semiconductor (UK) Limited, London (GB)

(*) Notice: Subject to any disclaimer, the term of this patent is extended or adjusted under 35 U.S.C. 154(b) by 0 days.

(21) Appl. No.: 15/584,287

(22) Filed: May 2, 2017

(65) Prior Publication Data

US 2017/0324332 A1 Nov. 9, 2017

(30) Foreign Application Priority Data

May 9, 2016 (DE) .................. 1 02016 207 918

(51) Int. Cl.
*H02J 1/10* (2006.01)
*H02M 3/158* (2006.01)
*G05F 1/46* (2006.01)
*G05F 1/10* (2006.01)
*H02M 1/00* (2006.01)

(52) U.S. Cl.
CPC ............ *H02M 3/1584* (2013.01); *G05F 1/10* (2013.01); *G05F 1/46* (2013.01); *H02M 2001/0003* (2013.01); *H02M 2001/0025* (2013.01)

(58) Field of Classification Search
CPC .. H02M 3/1582; H02M 3/1584; H02M 3/285; H02M 3/33561; H02M 7/49; H02J 3/46; H02J 3/38
See application file for complete search history.

(56) References Cited

U.S. PATENT DOCUMENTS

| 5,912,552 A | 6/1999 | Tateishi |
| 2005/0093525 A1 | 5/2005 | Walters et al. |
| 2007/0176581 A1 | 8/2007 | Chen et al. |

(Continued)

FOREIGN PATENT DOCUMENTS

DE 20 2014 002 223 5/2014

OTHER PUBLICATIONS

German Office Action, File No. 10 2016 207 918.2, Applicant: Dialog Semiconductor (UK) Limited, dated Dec. 7, 2016, 8 pgs. and English language translation, 10 pgs.

*Primary Examiner* — Adolf Berhane
*Assistant Examiner* — Afework Demisse
(74) *Attorney, Agent, or Firm* — Saile Ackerman LLC; Stephen B. Ackerman

(57) ABSTRACT

A multiphase switching converter with a plurality of phase circuits coupled with a common output node is presented. Each phase circuit has a drive signal generator to generate a separate drive signal for a switching element of the respective phase based on a feedback signal from the common output node. Multiple voltage loops with different bandwidths or hysteresis are suggested for a multiphase power converter. In embodiments, this allows a slow phase ('Master') with a big inductor and low switching frequency and one or multiple fast phases ('Slaves') with small inductors and high switching frequency. The Master phase will allow the system to have high efficiency at low output load, while the Slave phase(s) will deliver extra current during load transient and for higher loads.

24 Claims, 7 Drawing Sheets

(56) References Cited

U.S. PATENT DOCUMENTS

2012/0262136 A1* 10/2012 Nien .................. H02M 3/1584
                                                      323/272
2012/0326681 A1    12/2012 Shono
2013/0293210 A1    11/2013 Smith et al.
2015/0097542 A1     4/2015 Repton et al.

* cited by examiner

MULTIPHASE SWITCHING CONVERTER

TECHNICAL FIELD

The present document relates to a multiphase switching converter comprising a plurality of phase circuits coupled with a common output node for providing each a contribution to an output current of the converter.

BACKGROUND

In prior art multiphase power converters, a single voltage loop comparing a feedback voltage with a reference voltage and generating an error signal is provided. Thus, the regulation of the phases is based on the same quantity. Due to the single voltage loop, the limiting factor for stability is given by the phase with the biggest coil. In the same way, the transient performances of the system will be limited by the phase with the biggest inductor.

SUMMARY

There is a need to achieve faster transient performance of the regulation. Further, regulation speed shall not be limited by the inductance of the biggest inductor used.

The present document addresses the above mentioned technical problems. In particular, the above problems are solved by the claimed subject-matter according to the independent claims.

According to a broad aspect of the disclosure, multiple voltage loops with different bandwidths or hysteresis are suggested for a multiphase power converter. In embodiments, this allows to have a slow phase ('Master') with a big inductor and low switching frequency and one or multiple fast phases ('Slaves') with small inductors and high switching frequency. The Master phase will allow the system to have high efficiency at low output load, while the Slave phase(s) will deliver extra current during load transient and for higher loads.

In a first broad sense, a multiphase switching converter comprising a plurality of phase circuits coupled with a common output node is disclosed. Each phase circuit comprises a drive signal generator to generate a separate drive signal for a switching element of the respective phase based on a feedback signal from the common output node. The feedback signal may be the output voltage of the converter or a signal derived therefrom, e.g. a fraction of the output voltage or an error voltage derived from the output voltage based on a reference voltage. Thus, the phases may be operated individually, e.g. based on different reference or target voltages, using inductors of different sizes and/or different switching frequencies.

According to an aspect of the disclosure, a multiphase switching power converter comprising a plurality of phase circuits coupled with a common output node for providing each a contribution to an output current of the converter is disclosed. The multiphase switching converter may be any kind of switched mode power converter such as a boost converter, a buck-boost converter, negative buck-boost converter or other types. Further, the multiphase switching converter may be a hysteretic boost converter that has a variable operating frequency. The frequency may be adjusted according to the load current. When having a fixed off time, the frequency mainly depends on the duty-cycle which is mainly driven by Vin and Vout.

Each phase circuit of the converter may comprise a drive signal generator to generate a drive signal for a respective switching element of the phase based on an error signal for the phase. In other words, each phase has a dedicated error signal that is supplied to the drive signal generator of the phase. A drive signal generator may comprise a comparator and a ramp signal generator to generate its drive signal. The switching element of a phase is driven by a respective drive signal which may be a PWM signal that controls the open and closed phases of the switching element, thereby controlling current flowing through the switching element and the phase's contribution to the output current of the converter. The output current is made available at the output node for supplying a load. Typically, a capacitor is connected to the output node in parallel to the load for stabilizing the output voltage of the converter.

The converter may further comprise at least one error signal generator for generating a separate error signal for each phase based on the output voltage at the output node of the converter. Thus, each phase of the multiphase switching converter can be regulated separately, based on its dedicated error signal, thereby allowing for phases having different bandwidths so as to increase the overall transient performance of the converter. In embodiments, the error signals are error voltages that are generated in dependency of the output voltage of the converter.

In embodiments, the at least one error signal generator may comprise an error amplifier for each phase which each generate the respective error signal of the phase. In other words, each phase has its own assigned error amplifier. The error amplifiers may be operational transconductance amplifiers (OTA) having a transconductance Gm. An OTA is an amplifier whose differential input voltage produces an output current, i.e. it is a voltage controlled current source (VCCS). The output currents may then be converted to the error voltages by conversion networks coupled with the outputs of the OTAs for the individual phases. A conversion network may convert the OTA output current to voltage and comprise a resistor coupled with the OTA output and ground. Other elements may be provided, too. Each error amplifier or OTA comprises a first input for receiving a reference signal and a second input for receiving a feedback signal that is derived from the output voltage of the converter. Thus, the error signals are efficiently produced by relatively simple circuit elements.

In embodiments, the error amplifiers may receive different reference signals at their respective first inputs and receive a common feedback signal at their respective second inputs. The different error signals are thus generated based on the different reference signals that are applied to the individual error amplifiers associated with the phases. For example, the different reference signals are obtained from a common reference signal by applying individual offsets to obtain the different reference signals. In an embodiment, the common reference signal is used for the first error amplifier and the common reference signal minus or plus an offset is used for the second error amplifier. This schema may be extended to further phases by subtracting a second offset (e.g. equal to the first offset or two times the first offset), etc.

In embodiments, the error amplifiers may receive a common reference signal at their respective first inputs and receive different feedback signals derived from the output voltage at their respective second inputs. The different feedback signals may be derived in different ways from the output voltage, e.g. as different fractions of the output voltage. For example, the feedback signals may be obtained from different tabs of a resistor divider that is coupled with the output node. In a simple example, the target output voltage of a boost converter may be 5V and the offset between the phases may be 100 mV. Then, the reference voltages derived from the resistor divider may be e.g. 5V, 4.9V, 4.8V, etc. This allows efficient generation of the individual error signals for the different phases.

In embodiments, the at least one error signal generator may comprise a single error amplifier with multiple output stages. The respective outputs of the multiple output stages generate an error signal for the corresponding phase of the converter. The single error amplifier comprises a first input for receiving a reference signal and a second input for receiving a feedback signal that is derived from the output voltage of the converter.

An offset generator may be coupled with an output of the multiple output stages for generating an offset for the error signal of the corresponding phase. For example, the offset generator may comprise a current source. The current source is injecting a predefined current into the output of the error amplifier, which may be an OTA. Thus, the OTA output current and the predefined offset current add up and, via a conversion network (e.g. a resistor connected to ground), are converted to an error voltage. Multiple outputs of the single error amplifier may have dedicated current sources injecting different currents for corresponding phases, thereby producing different phase offsets in the error signals.

The multiphase switching converter may comprise a duty cycle limiter for limiting the maximum duty cycle of the drive signal of a phase of the plurality of phases. Thus, the current contribution of the phase to the total output current is limited to a given value. In embodiments, the duty cycle limiter may comprise a clamp for limiting the error signal of the respective phase to a maximum value. By limiting the error signal to a maximum value, a given current is contributed to the total output current of the converter.

In embodiments, an asynchronous hysteretic multiphase switching power converter is provided. As before each phase circuit comprises a drive signal generator to generate a separate drive signal for a switching element of the respective phase based on a feedback signal from the common output node. The drive signal generators each comprise a hysteresis block and a latch generating the drive signal for the switching element of the respective phase. Thereby, the hysteresis block provides set and reset signals for the latch depending on the feedback signal and optionally taking into account further signals representing the operating state of the converter.

The hysteresis block may comprise an under-voltage comparator for comparing the feedback signal with a reference signal and generating the latch set signal. In other words, when the comparator output signal (represented by the feedback signal) is below a threshold, the latch is set and the switching element is enabled.

The hysteresis block may further comprise a delay element for generating the latch reset signal after a predetermined delay has lapsed, thereby resetting the latch and disabling the switching element, thus providing the hysteresis.

The hysteresis block may comprise another comparator for comparing a current sense signal (e.g. derived by a current sensor for the phase) with another reference signal. The another reference signal may be a fixed current limit, or derived from an error voltage of the phase. The comparator output is supplied to a delay element for generating the latch reset signal.

According to another aspect of the disclosure, a multiphase switching power converter comprising a plurality of phase circuits coupled with a common output node for providing each a contribution to an output current of the converter is disclosed. Each phase circuit comprises a drive signal generator to generate a PWM drive signal for a switching element of the phase based on an error signal. The converter and in particular the drive signal generator may be similar to the above described and comprise the same components. For example, the converter comprises a single error signal generator for generating the error signal based on the output voltage of the converter at the output node. Further, the drive signal generators may each comprise a comparator and a ramp signal generator to generate a PWM signal. The comparator compares the error signal and a signal that is based on the ramp signal of the phase. In this aspect, the ramp signals of the phases having different pedestals. By using different ramp signals for each phase, different drive signals for the switching elements can be generated and the phases can be regulated individually. This aspect may be combined with the first aspect of providing different error signals for the phases.

Each drive signal generator may comprise a current sensor for sensing the current contribution of the phase. A signal that is indicative of the current contribution of the respective phase may be added to the ramp signal of the phase before supplied to the comparator of the phase.

In any of the above multiphase switching power converters, each phase circuit may comprise a coil of a different inductance. Since the coil size determines the speed and bandwidth of a phase, this allows having phases with different transient behaviour and bandwidth. For example, a slow Master phase and a fast responding Slave phase may be designed to provide a flexible multiphase converter having a flexible response to load transients.

The multiphase switching converter may comprise at least one compensation network coupled with the output(s) of the at least one error signal generator for ensuring stability of the regulation loop. The compensation networks may be identical for all phases or adapted individually for the phases. A compensation network may comprise a resistor and/or a capacitor to provide a simple low pass filter. Further more complex filters may be applied. The compensation network may be combined with the current to voltage conversion network into one network of circuit elements that is connected with the output of the error signal generator.

The drive (e.g. PWM) signals of the different phases may have a different pulse frequency. Thus, the switching elements of the phases operate at different frequencies, thereby allowing different operating frequencies and bandwidths for the phases. Hence, fast responding and high bandwidth regulation in selected phases can be provided.

Further modifications may be made to the multiphase switching converters of the above disclosed aspects. For example, the ramp signals for different phases may have different frequencies and slopes.

According to another broad aspect, a method for operating a multiphase switching converter comprising a plurality of phases is disclosed. The method comprises generating a drive signal for each switching element of the phases based on a feedback signal from the common output node; and operating the switching elements of the phases based on the respective drive signals for the phases.

According to an aspect, a method for operating a multiphase switching power converter comprising a plurality of phases is disclosed. The power converter may be as described above. The method may comprise generating a separate error signal for each phase based on the output voltage of the converter; generating a drive signal for each switching element of the phases based on the respective error signal for the phase; and operating the switching elements of the phases based on the respective drive signal for the phase.

In embodiments, the separate error signals may be generated based on different reference voltages and a common feedback signal that are supplied to error amplifiers for the phases.

In embodiments, the separate error signals may be generated based on a common reference voltage and different feedback signals that are supplied to error amplifiers for the phases.

In embodiments, the separate error signals may be generated based on different offsets that are added to the output of a common error amplifier.

According to another aspect, a method for operating a multiphase switching converter comprising a plurality of phases is disclosed. The power converter may be as described above. The method may comprise generating an error signal based on the output voltage of the converter; generating a drive signal for each switching element of the phases based on the error signal; and operating the switching elements of the phases based on the respective drive signal for the phase. Generating a drive signal for a phase may comprise comparing the error signal and, in case of PWM operation, a signal that is based on a ramp signal together with a current sensing signal of the respective phase, wherein the ramp signals of the phases have different pedestals. In case of hysteretic mode, the error signal might be directly compared to the current sensing signal.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the terms "couple", "coupled", "connect", and "connected" refer to elements being in electrical communication with each other, whether directly connected e.g., via wires, or in some other manner.

DESCRIPTION

Figure 1:
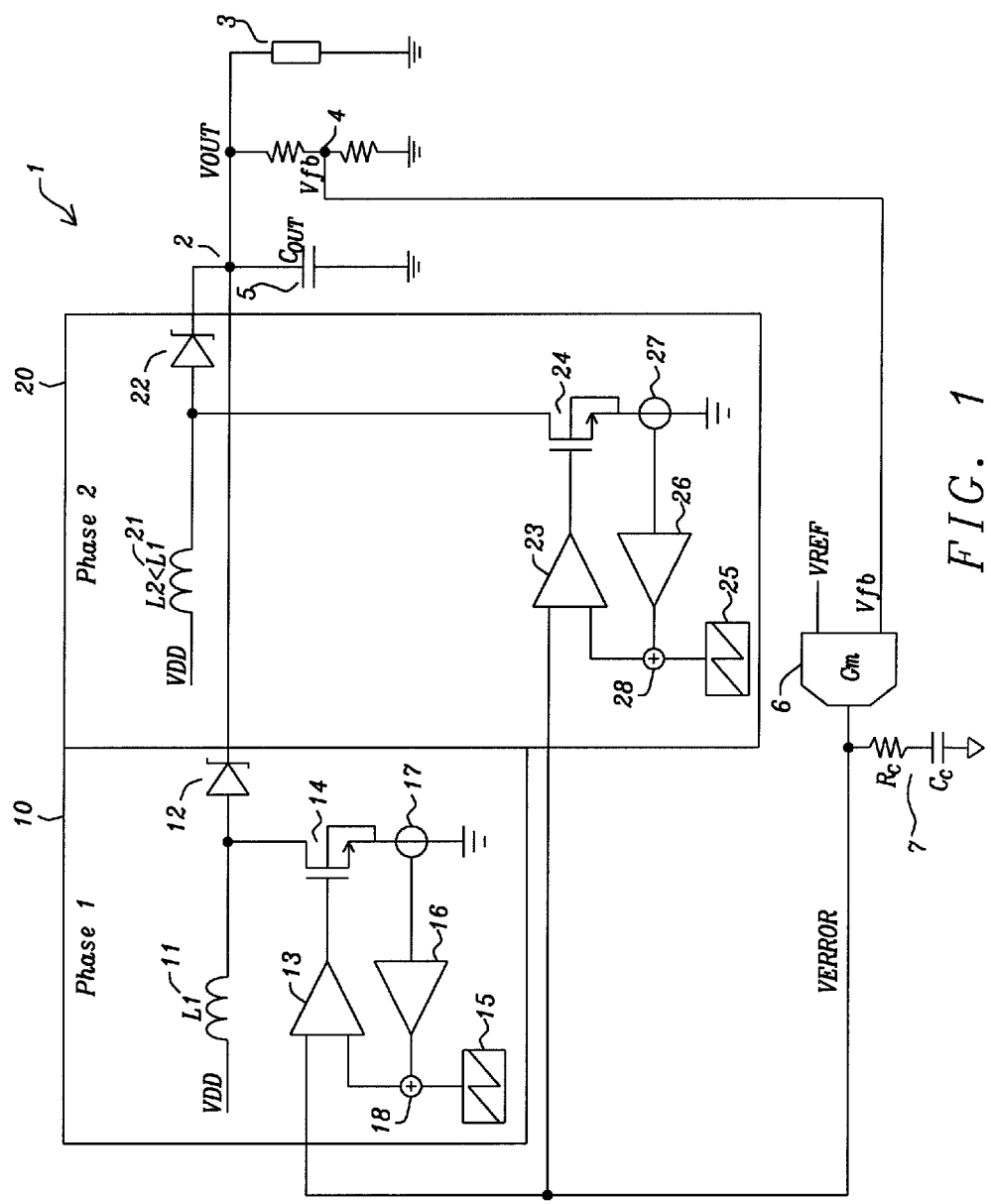
FIG. 1 shows a multiphase boost converter with asymmetric coils.

FIG. 1 shows a peak current mode controlled multiphase boost converter 1 with asymmetric coils. In this converter topology, a single voltage loop compares a feedback voltage Vfb with a reference voltage Vref and generates a single error signal Verror which controls the peak current into the phases' coils. The two phases have different coils L1, L2 and may switch at different switching frequencies in order to have comparable peak coil currents for the both phases.

The multiphase boost converter has an output node 2 to which a filter capacitor 5, a load 3, and a resistor divider 4 are connected. The output voltage Vout is available at the output node 2 and a fraction thereof is provided by the resistor divider 4 as feedback voltage Vfb.

Phase sub-circuit 10 for phase 1 comprises the inductor 11, diode 12 and switching element 14, here a MOSFET. A PWM signal generator for phase 1 comprises a comparator 13 generating a drive signal for switching element 14, and a ramp signal generator 15. The ramp signal generator 15 generates, e.g., a saw tooth signal having a defined period and magnitude. The error signal (voltage) Verror and a signal derived from the ramp signal generated by the ramp signal generator 15 are input to the comparator 13. The current flowing through the switching element 14 is detected by a current sensor 17 and amplified by current amplifier 16. The amplified current signal is added to the ramp signal in adder 18 and the sum is input to the comparator 13.

Phase sub-circuit 20 for phase 2 comprises similar elements providing similar functions, for example inductor 21, diode 22 and switching element 24. A PWM signal generator for phase 2 comprises a comparator 23 generating a drive signal for switching element 24, and a ramp signal generator 25. A current sensor 27, a current amplifier 26, and adder 28 are also provided for phase 2.

An error amplifier 6 is implemented with an OTA with transconductance Gm and creates a type-II compensation with the addition of the passive compensation network 7 comprising resistor Rc and capacitor Cc. It is to be noted that this type-II compensation scheme has a very high DC gain (ideally infinite). Also, in order to make the converter startup reproducible, it is necessary to discharge the capacitor Cc prior to startup to provide a defined initial condition.

As said, the voltage regulation loop needs to be compensated in order to provide good phase margin over all operating points, load conditions and external components tolerance. As there is only a single voltage loop, the limiting factor for stability is given by the Right Half Plane Zero (RHPZ) of the phase with the biggest coil. This means that the overall system needs to have a bandwidth lower than the RHPZ of the phase with the biggest coil, independently of the inductance value used for the other phase. Hence, the transient performance of the system will be limited by the phase with the biggest inductor.

The present document suggests a solution to achieve a faster overall transient performance of the regulator where the regulator speed shall not be limited by the inductance of the biggest inductor used.

This is achieved in an embodiment by the use of multiple voltage loops with different bandwidths or hysteresis, providing to have a slow phase ('Master') with big inductor and low switching frequency and one or multiple fast phases ('Slaves') with small inductors and high switching frequency. The Master phase will allow the system to have high efficiency at low output load, while the Slave phase(s) will deliver extra current during load transient and for higher loads.

Figure 2:
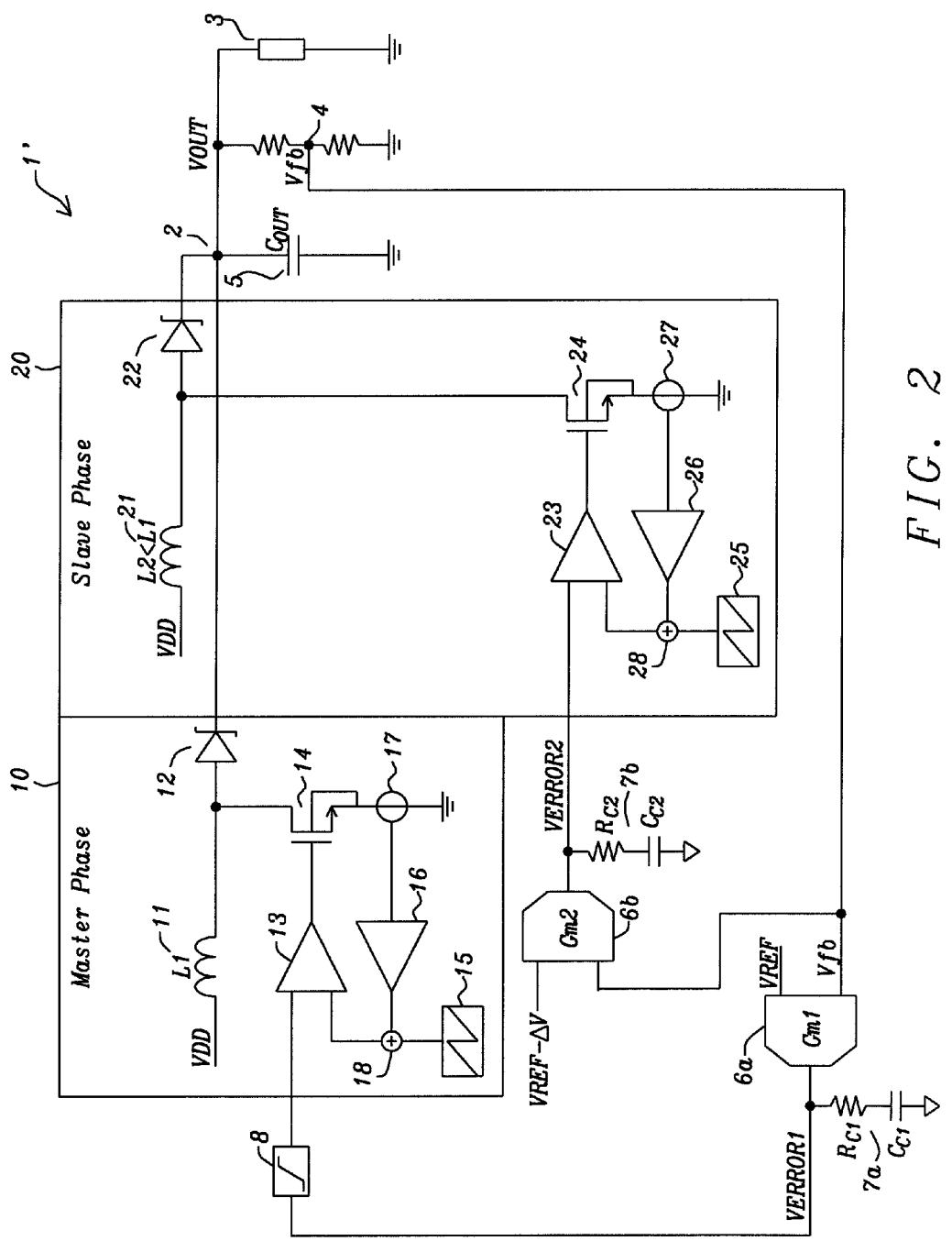
FIG. 2 shows a block diagram of an embodiment for an asymmetric multiphase boost regulator with dual voltage loops.

FIG. 2 shows a block diagram of an embodiment for an asymmetric multiphase boost regulator 1' with dual voltage loops for the case of two phases with similar elements as shown in FIG. 1 (having same reference numerals). The same architecture can be extended for a larger number of phases or for different DC-DC converters, such as Buck, Buck-Boost, negative Buck-Boost or SEPIC converters. The two phases are called Master phase and Slave phase. The architecture of both Master and Slave is the same, but the two phases may operate with different coil values, switching frequencies, pass device size, error amplifiers, compensation ramp slope and current sense gain.

In the proposed system, each phase is driven with its own error voltage Verror1, Verror2, coming from dedicated error amplifiers 6a, 6b for the individual phases. Separate compensation networks 7a, 7b comprising resistor $Rc_1$ and capacitor $Cc_1$, respectively resistor $Rc_2$ and capacitor $Cc_2$ for the 2 phases are provided. In the multiphase converter of FIG. 1, only a single error amplifier is shared for both phases, creating a single voltage feedback loop.

Each of the error amplifiers 6a, 6b is compensated by a compensation network 7a, 7b to make its phase stable. The Master phase is generally compensated by strongly reducing its bandwidth due to the low frequency of the RHPZ determined by the large value of the coil inductance. This is achieved by minimizing the product $Gm_1/C_{C1}$.

The Slave phase, due to the smaller value of the coil inductance L2<L1 (hence higher frequency RHPZ), can be made stable with much larger bandwidth than the Master phase, making the $Gm_2/C_{C2}$ product larger.

An aspect of this topology is that the Master and Slave phase error amplifiers have as input a different reference voltage: Vref for the Master phase, Vref−ΔV for the Slave phase. Due to this offset in the reference voltage, the two voltage loops will try to regulate the two phases independently to achieve different output voltages, namely Vref for the Master phase, Vref−ΔV for the Slave phase.

During operation, one of the phases may switch at lower frequency than the others, and may be the only phase delivering current to the output in a condition of low load. During a load transient condition, the phases with the lower inductance values may start providing current to the output right after the load transient happens, and before the current provided to the output by the master phase will increase significantly.

Due to the fact that the depicted boost converter topology is only able to source current into the output, but not to sink it, in steady state, the system will regulate the output voltage based on the reference voltage of the Master phase, being this the highest voltage (for ΔV>0). The Slave phase error amplifier will see the feedback voltage Vfb being higher than Vref−ΔV, so it will drive Verror2 towards zero volts, forcing this phase to work with zero duty cycle. In this condition, only the Master phase will be switching (active) and delivering current to the output. Thus, also only the Master phase will determine the stability of the system.

Figure 3:
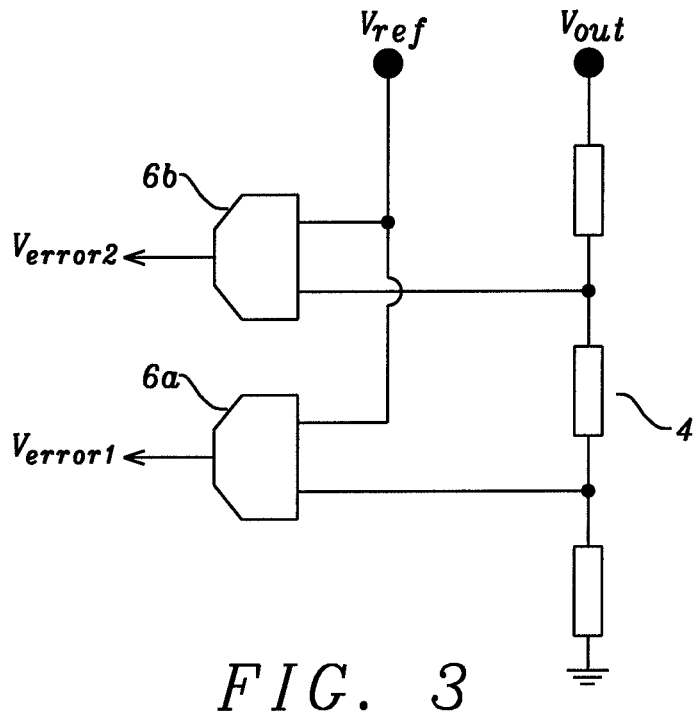
FIG. 3 shows a partial block diagram of another embodiment for an asymmetric multiphase boost regulator.

It is to be noted that the offset between Master and Slave could also be implemented by having two different feedback points from different taps in the output resistor divider 4 as shown in FIG. 3. The error amplifiers 6a, 6b receive at their respective first input a common reference voltage Vref. Different feedback voltages Vfb1 and Vfb2 are supplied to the second inputs of the error amplifiers 6a, 6b from different taps of the resistor divider 4.

Figure 4:
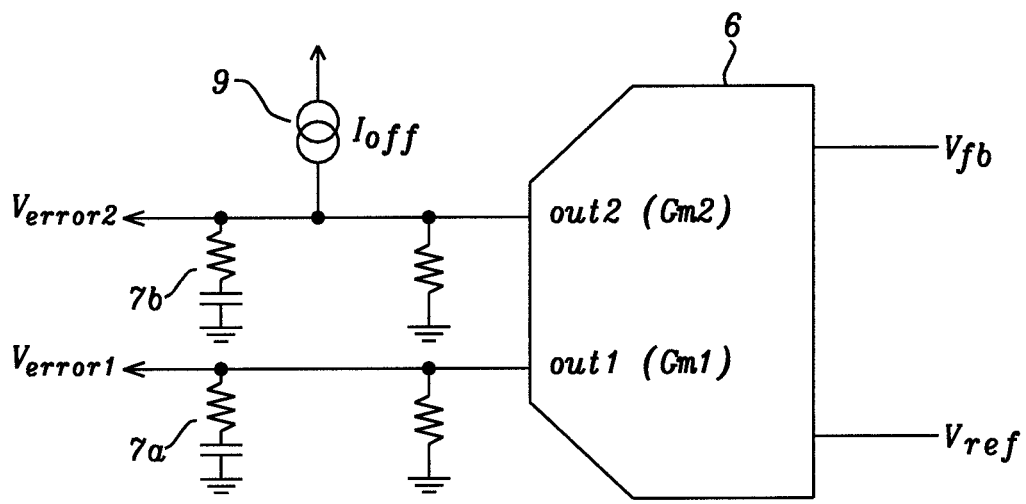
FIG. 4 shows a partial block diagram of another embodiment for an asymmetric multiphase boost regulator.

It is to be noted that the same function (i.e. different error signals for the phases) could be achieved by using a single error amplifier with multiple output stages, as long as it will have a DC gain low enough to allow introducing an offset between the two outputs, which will translate in a significant equivalent input offset. An example for such common error amplifier 6 of this embodiment is shown in FIG. 4. It is implemented as OTA and receives the feedback voltage Vfb and the reference voltage Vref at its inputs and has 2 outputs out 1 and out2. The transconductance for the 2 output stages Gm1 and Gm2 may be different or the same. A first compensation network 7a is connected to the first output and a second compensation network 7b is connected to the second output. The different outputs of the single error amplifier with multiple output stages can optionally drive different compensation networks 7a, 7b, with different time constants. Optionally, a separate conversion resistor is provided to convert the current output by the OTA 6 into a corresponding error voltage Verror. A current source 9 delivers a constant offset current Ioff that is added to the OTA current output to provide an offset to Verror2. The resulting offset voltage Voff is Ioff/Gm2. Thus, separate and different error voltages Verror1 and Verror2 are generated for the 2 phases.

In another embodiment, the same effect can be achieved by shifting the pedestal of one of the ramps, thereby generating different drive signals for the switching elements of different the phases. Assuming an offset to the pedestal for the Slave phase ramp by a voltage ΔVped, the equivalent input offset for the Slave phase OTA would be ΔV=ΔVped/G2, where G2 is the DC voltage gain of the OTA (which equals to Gm2*$R_2$, where $R_2$ is the equivalent DC impedance at the output of the OTA).

It is to be noted in FIG. 2 that a voltage clamp 8 is inserted between the output of the Master phase error amplifier 6a and the PWM comparator 13 of the same phase. This clamp 8 limits the error voltage at the input of the PWM comparator 13, thereby limiting the maximum duty cycle of the Master phase. In case the output current will increase, in steady state operation, the Master phase error voltage Verror1 will increase, while the slave phase Verror2 will still stay at zero volts. This is true until Verror1 is below the clamping level of the voltage clamp 8. For higher output currents, Verror1 will increase, but exceeding the clamping level, the Master phase will be in duty cycle limitation and will not be able to provide enough current to the load. The output voltage will then decrease, until the feedback voltage Vfb gets lower than the Slave phase error amplifier's reference voltage Vref−ΔV. At this point the Slave phase error voltage Verror2 will start increasing, and the slave phase will start switching and delivering current to the output. It is to be noted that in this condition, the Master phase will act as a constant current source dependent on the clamping level of Verror1, while all the excess current will be delivered by the Slave phase. As the Master phase loop gain is zero at this point (a variation in Verror1 does not translate in a variation of the current delivered to the output), only the Slave phase will contribute to the system stability.

It is to be noted that the duty cycle limitation in the Master phase can be achieved by other means, for example by forcing the Master phase to operate with a certain minimum OFF time. Let's assume the switching period for the Master Phase is equal to $T_{sw,MST}$ and let's assume that a minimum OFF time $T_{minOFF}$ is generated, the PWM signal driving the Master Phase switching element must be low at least for the duration of the minimum OFF time $T_{minOFF}$. In this case, the duty cycle will be limited to $D_{MAX}=(T_{sw,MST}-T_{minOFF})/T_{sw,MST}$. The minimum OFF time can be generated, for instance, by a monostable multivibrator circuit.

The above analysis can be extended to the load transient behaviour of the system. Assuming the output load to be small in the beginning, the system will be operating with only the Master phase switching and delivering current to the output, while the Slave phase will be not switching. The output feedback voltage Vfb will be regulated at Vref.

Let's assume that a fast load transient will happen, and the load current will rapidly increase to a value still lower than the current capability of the Master phase. Initially the output voltage will decrease, due to the limited bandwidth of the Master phase. If the load transient is big enough to make Vfb decrease below Vref−ΔV, the Slave phase will quickly activate and start delivering current to the output, regulating Vfb to Vref−ΔV. During this time, the Master voltage loop will slowly increase the error voltage Verror1 causing the Master phase to deliver more and more current, while the opposite will happen to the Slave phase, that will see Verror2 decreasing and hence it will deliver less and less current to the output. At steady state, the Master phase will be again delivering all the output current, while the Slave phase will be not switching.

Whenever the load exceeds the current capability of the Master phase, all the extra current will be delivered by the Slave phase.

Figure 5:
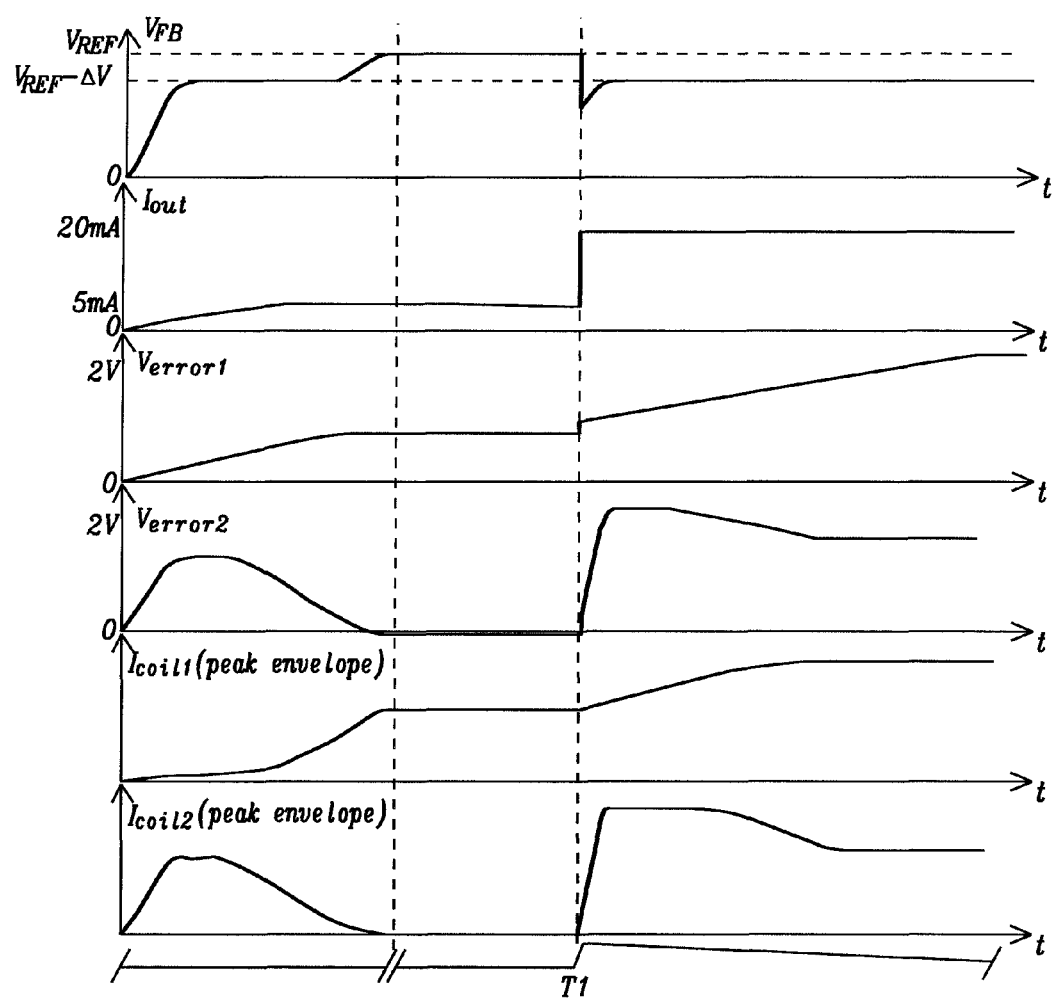
FIG. 5 shows schematic timing diagrams for an embodiment of the boost converter regulator topology of FIG. 2.

FIG. 5 shows schematic timing diagrams for the boost converter regulator topology of FIG. 2. The top most diagram shows the feedback voltage Vfb and reference voltages Vref and Vref−ΔV. The second diagram shows the output current Iout. The third diagram shows the error voltage Verror1 for the $1^{st}$ phase. The dotted line indicates the clamped error voltage as output by voltage clamp 8. The forth diagram shows the error voltage Verror2 for the $2^{nd}$ phase. The two bottom diagrams show the peak envelopes of the coil currents Icoil1 and Icoil2 of the two phases of the multiphase boost converter of FIG. 2.

In FIG. 5, the boost converter is started up with low load, so that in steady state the Master phase 1 will be the only one delivering current. The output current is then increased to a value higher than the Master phase's current capability. The following things should happen more or less at the same time in the diagram:
1. Start-up phase ends
2. $V_{fb}$ reaches $V_{ref}$
3. $I_{out}$ reaches 5 mA
4. $V_{error1}$ reaches static value
5. $I_{coil1}$ reaches its static value As shown in FIG. 5, at the beginning of the start-up, the Slave phase 2 provides all the current, while the Master phase slowly gets to steady state. This can be seen looking at the average coil currents without ripples Icoil_1 (Master) and Icoil_2 (Slave). During the first part, dominated by the Slave phase, a fast startup is provided by the Slave phase and the feedback voltage is regulated to Vref−ΔV. As the Master phase delivers more current and catches up, the feedback voltage increases, until it gets to Vref when the Master phase delivers all the output current. The Master phase regulates the output voltage at Vref. It can be seen at this stage that Verror2 decreases to zero volts, while Verror1 is below the clamping level.

At t=T1 a load transient happens. The Slave phase quickly turns on, delivering all the extra current to the output. The Master phase will slowly deliver more and more current, until Verror1 reaches its clamping level and the Master phase is clamped at its maximum current capability. At this point the system gets in steady state with the Master phase delivering its maximum current and the Slave phase delivering the extra current to the output. Vfb is regulated at Vref−ΔV.

Figure 6:
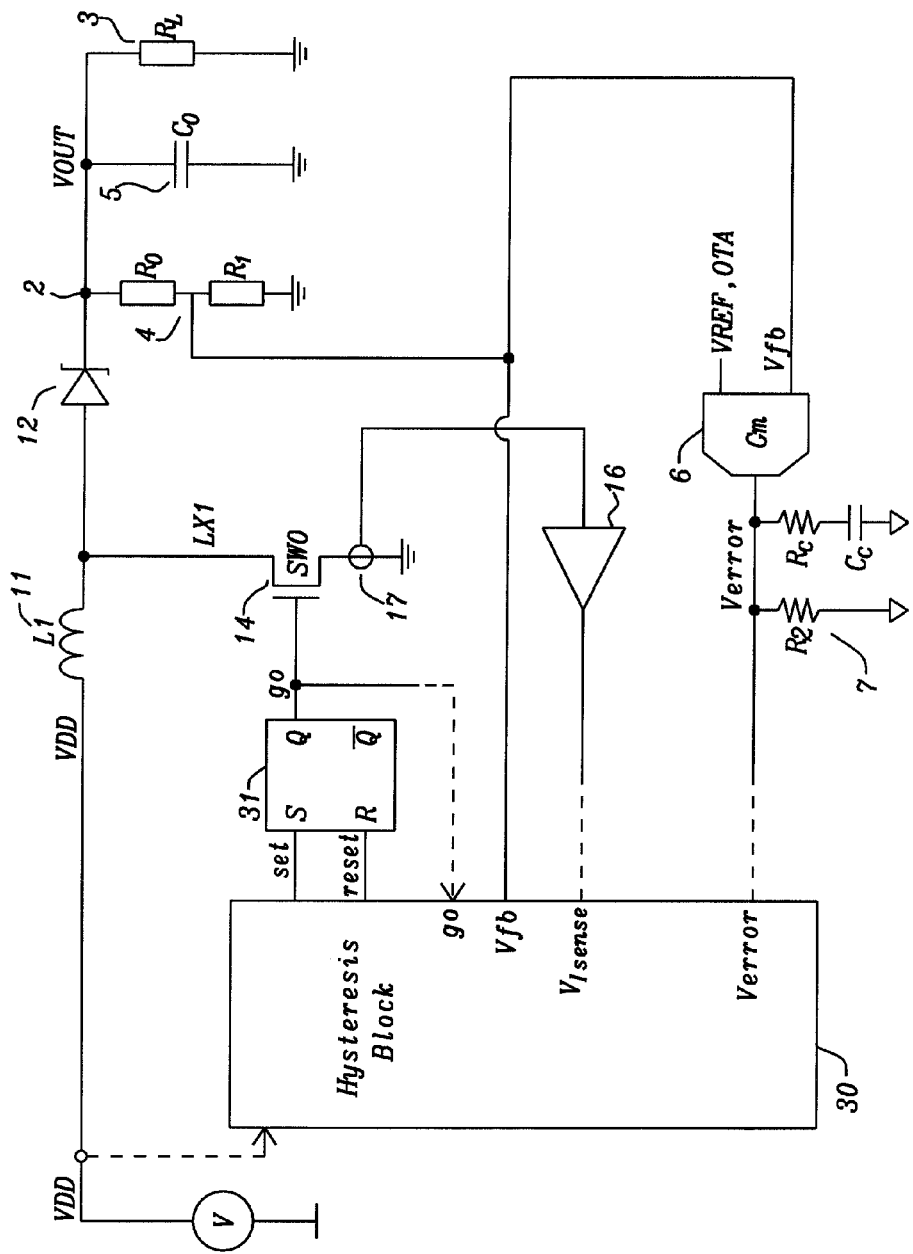
FIG. 6 shows a multiphase boost converter with hysteresis.

All the aforementioned concepts can also be extended to a hysteretic boost converter. This type of converter has no constant switching frequency (as given by the ramp reset in the aforementioned system). The frequency may e.g. depend on the load current and consequently on the time needed for going through a hysteresis. The blocks generally used in hysteretic boost architecture are shown in FIG. 6. For simplicity, this block diagram does only include one phase. Similar elements are denoted with same reference numerals as in the circuits before. In addition, a latch 31 is provided between the comparator 13 and the switching element 14. In real applications, the signal strength of a comparator or a latch may have to be increased by a driver circuit (not shown) to drive the gate of a big pass device. The set input S of the latch 31 is connected with the output of comparator 13 and the reset input R of the latch 31 is connected with an output of "Hysteresis Block" 30.

In operation, the turn-on of switch SW0 14 is triggered by a voltage comparator 13 in Hysteresis block 30 which compares the feedback voltage Vfb (derived via voltage divider 4 from Vout) to a reference voltage Vref. When Vfb goes below Vref, the output of comparator sets the latch 31 which drives (via a signal go) the transistor SW0 14. When the loop went through a certain hysteresis given by the Hysteresis block 30, the transistor switch SW0 14 is turned off again and the inductor-energy can be transferred to the output 2 by (Schottky) diode D0 12. Now or earliest after a certain delay which might be forced such that the coil current can decay, the next pulse can be triggered by the voltage comparator 13. Such a delay might be given by the conduction time of D0. The feedback voltage Vfb might be input into OTA 6, together with another reference voltage $V_{ref,OTA}$. As above, compensation network 7 might generate error voltage Verror from the OTA output.

Depending on the implementation of the Hysteresis block 30, further control signals of the system (dashed lines) may be supplied to the Hysteresis block 30. Hysteresis block 30 may receive, as inputs, at least one of the input voltage Vin, the comparator output signal, the latch output signal go, the sensed current from a current sensor 17 (possibly via current amplifier 16), a reference current or voltage, and the output voltage Vout (not shown). Depending on the implementation, not all input signals and blocks generating those signals are needed. For example, in case that the hysteresis shall be based on the inductor current (in this example measured at ground—other measurements also possible), the current sensor 17 and eventually an OTA 6 which converts changes in the feedback voltage Vfb to a variable reference current are needed. The inputs to OTA are the feedback voltage Vfb and a reference voltage $V_{ref,OTA}$. Of course, the reference current output by OTA 6 might go through a compensation network 7, e.g. a filter comprising Rc, Cc and R2.

Figure 7A:
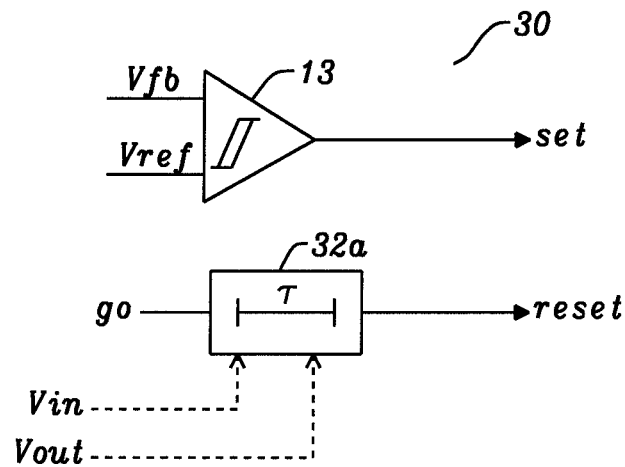
FIGS. 7a, 7b show example diagrams for possible implementation of a hysteresis.
Figure 7B:
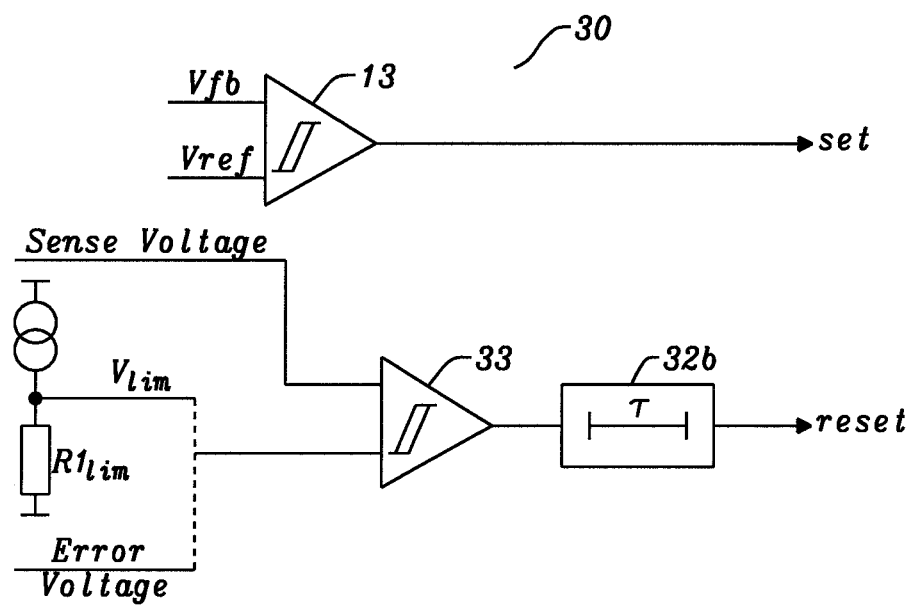

FIGS. 7a, 7b show different examples of such a Hysteresis block 30. In the simplest case a), the hysteresis is just given by a timer 32b which triggers the reset signal based on a delay τ applied to the latch output go. The delay of this timer might be of course influenced by different parameters like input voltage Vin, output voltage Vout, etc. to obtain the desired current hysteresis. The figure also shows the voltage comparator 13 configured to compare the feedback voltage Vfb to a reference voltage Vref and to generate the set signal for the latch 31, which may be considered part of the Hysteresis block 30. Thus, when the output voltage drops below a threshold, the latch 31 is set and the switch 14 is enabled. After expiration of the delay τ, the latch 31 is reset and the switch 14 is disabled. If at this time the output voltage is still below the threshold and the comparator output is on (i.e. the set signal is on), an auxiliary circuit (not shown) may be provided that ensures that the reset signal dominates over the set signal and the latch is reset nevertheless.

The hysteresis can also be derived from the coil current as measured by the current sensor 17 and the reset can be triggered by a fixed current limit derived from a fixed reference current $I_{lim}$. An example for such Hysteresis block is illustrated in FIG. 7b. The reference current could also be variable and come from the OTA 6 in FIG. 6, for example in the form of error voltage Verror. FIG. 7b shows that a signal Vsense corresponding to the coil current (generated by the current amplifier 16 in FIG. 2) is compared by a comparator 33 with a reference signal corresponding to the reference current (e.g. as generated by a current source $I_{lim}$ and a resistor $R_{IL}$). Alternatively, the signal Vsense corresponding to the coil current is compared with the error voltage Verror generated by OTA 6 and compensation network 7 in FIG. 2. Finally, a combination of both cases depending on an operation mode selector is possible. A timer 32b then triggers the reset signal based on a delay $\tau$.

Figure 8:
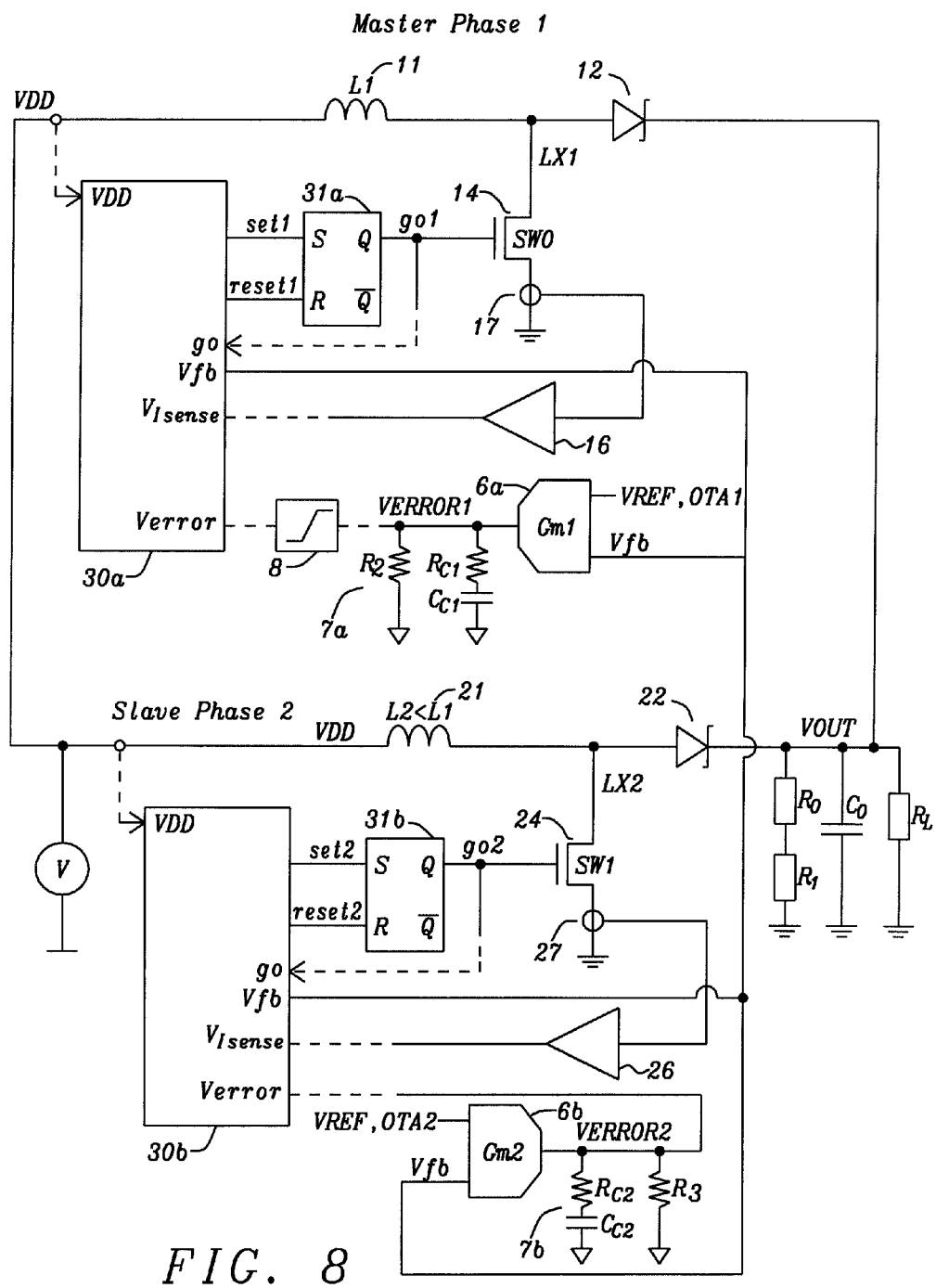
FIG. 8 shows a block diagram of an embodiment for an asymmetric multiphase boost regulator with dual voltage loops and hysteresis.

If this control loop is extended to dual (or multiple) phase operation with asymmetric coils, the above-mentioned concepts can be implemented as shown in FIG. 8. In this case, phase 1 is the Master phase with the larger inductor value. In the depicted example, each phase has its own voltage comparator 13, 23 with a different reference voltage $V_{ref1}$, $V_{ref2} = V_{ref1} - \Delta V_{ref}$. As before, the 2 reference voltages might have an offset such that phase 2 is not switching at low currents. When the load current exceeds the maximum current capability of phase 1, then the output voltage Vout starts dropping. Thus, phase 2 starts operating as soon as the feedback Vfb went down to the $2^{nd}$ reference voltage $V_{ref2} = V_{ref1} - \Delta V_{ref}$ which is typically some ten mV lower than the first one $V_{ref}$. Phase 1 still delivers its maximum current. When the load current is reduced again, the output voltage Vout will rise to $V_{ref1}$, the $2^{nd}$ comparator 23 will not trigger anymore and phase 2 stops switching.

In addition, the OTAs 6a, 6b may apply different reference voltages $V_{ref,OTA1}$ and $V_{ref,OTA2}$ so that after I/V conversion via compensation networks 7a, 7b two different OTA error voltages Verror1 and Verror2 are obtained, which may be input to Hysteresis blocks 30a, 30b, respectively. Thus, the Hysteresis blocks 30a, 30b for the Master phase and the Slave phase may use different internal reference signals for comparing with the signals Vsense1, Vsense2 for the Master phase and the Slave phase in the respective comparators 33. Hence, the set and/or reset signals for the latches 31a, 31b and consequently the switch drive signals go1, go2 may be generated individually for the different phases. Thus, the above disclosed advantages apply for the hysteretic boost converter as well.

As before, a voltage clamp 8 may be used to limit the error voltage Verror1 of the Master phase to a given range, and thereby limit the current pulse generated when the latch 31a of the Master phase is triggered.

Also in this system the Hysteresis block 30 might have different parameters for both phases, for example
Shorter delay for smaller inductor due to the higher di/dt
Higher filter bandwidth on filter2 due to the lower time constant of phase 2
Hysteresis given by a timer for phase 1 and by a current comparator for phase 2. Thus a very low controller current consumption can be achieved when only one phase is active in case of low load currents As mentioned for the synchronous implementation above, the voltage offset between the phases can be also realized in another way than by having 2 different reference voltages. For example, the OTAs may receive a common reference voltage but different feedback voltages or a single OTA with multiple output stages may be employed as explained above in reference to FIGS. 3 and 4. In addition, the error voltage(s) may be generated by other types of (differential) operational amplifiers directly producing a voltage based on the feedback voltage and the reference voltage. Further, current comparators might be used in the hysteresis block to generate the set and/or reset signal.

Generally diodes and MOSFETs in this document can be replaced by other types of switches. In the control loop generally voltage signals like Verror1/2, ramp-voltage etc. can be replaced by current signals. The analogue control loops might be of course replaced by a digital ones including DACs/ADCs where needed.

The latches 31a, 31b may also be implemented with other register elements such as clock-gated flip-flops. In this case, signals like clock and reset or clock and pre-set may be needed to operate the flip-flops.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A multiphase switching converter comprising a plurality of phase circuits coupled with a common output node, wherein
   each phase circuit comprises a drive signal generator to generate a separate drive signal for a switching element of the respective phase based on a feedback signal from the common output node,
   the converter comprises at least one error signal generator for generating a separate error signal for each phase based on the output voltage of the converter at the common output node,
   the drive signal generators of the phase circuits generate the drive signals based on the error signals of the respective phase, and
   the at least one error signal generator comprises an error amplifier for each phase which each generate the respective error signal of the phase, each error amplifier comprising a first input for receiving a reference signal and a second input for receiving a feedback signal that is derived from the output voltage of the converter.

2. The multiphase switching converter of claim 1, wherein the error amplifiers receive different reference signals at their respective first inputs and receive a common feedback signal at their respective second inputs.

3. The multiphase switching converter of claim 1, wherein the error amplifiers receive a common reference signal at their respective first inputs and receive different feedback signals at their respective second inputs.

4. The multiphase switching converter of claim 3, wherein the feedback signals are obtained from different tabs of a resistor divider that is coupled with the output node.

5. The multiphase switching converter of claim 1, wherein each phase circuit comprises a coil of a different inductance.

6. The multiphase switching converter of claim 1, comprising at least one compensation network coupled with the output(s) of the at least one error signal generator.

7. The multiphase switching converter of claim 1, wherein the drive signals of the
phases have a different frequency and the switching elements operate at the different frequencies.

8. A multiphase switching converter comprising a plurality of phase circuits coupled with a common output node, wherein
each phase circuit comprises a drive signal generator to generate a separate drive signal for a switching element of the respective phase based on a feedback signal from the common output node,
the converter comprises at least one error signal generator for generating a separate error signal for each phase based on the output voltage of the converter at the common output node,
the drive signal generators of the phase circuits generate the drive signals based on the error signals of the respective phase, and
the at least one error signal generator comprises a single error amplifier with multiple output stages, the outputs of the multiple output stages generating a respective error signal for the corresponding phase of the converter, the error amplifier comprising a first input for receiving a reference signal and a second input for receiving a feedback signal that is derived from the output voltage of the converter.

9. The multiphase switching converter of claim 8, wherein an offset generator is coupled with an output of the multiple output stages for generating an offset for the error signal of the corresponding phase.

10. The multiphase switching converter of claim 9, wherein the offset generator comprises a current source.

11. The multiphase switching converter of claim 8, wherein each phase circuit comprises a coil of a different inductance.

12. The multiphase switching converter of claim 8, comprising at least one compensation network coupled with the output(s) of the at least one error signal generator.

13. The multiphase switching converter of claim 8, wherein the drive signals of the phases have a different frequency and the switching elements operate at the different frequencies.

14. A multiphase switching converter comprising a plurality of phase circuits coupled with a common output node, wherein
each phase circuit comprises a drive signal generator to generate a separate drive signal for a switching element of the respective phase based on a feedback signal from the common output node, and
the drive signal generators each comprise a hysteresis block and a latch generating the drive signal for the switching element of the respective phase, the hysteresis block providing set and reset signals for the latch.

15. The multiphase switching converter of claim 14, wherein the hysteresis block
comprises a comparator for comparing the feedback signal with a reference signal and generating the latch set signal.

16. The multiphase switching converter of claim 14, wherein the hysteresis block
comprises a delay element for generating the latch reset signal.

17. The multiphase switching converter of claim 14, wherein the hysteresis block
comprises another comparator for comparing a current sense signal with another reference signal, and a delay element for generating the latch reset signal.

18. The multiphase switching converter of claim 14, wherein each phase circuit comprises a coil of a different inductance.

19. The multiphase switching converter of claim 14, comprising at least one compensation network coupled with the output(s) of the at least one error signal generator.

20. The multiphase switching converter of claim 14, wherein the drive signals of the phases have a different frequency and the switching elements operate at the different frequencies.

21. A multiphase switching converter comprising a plurality of phase circuits coupled with a common output node, wherein
each phase circuit comprises a drive signal generator to generate a separate drive signal for a switching element of the respective phase based on a feedback signal from the common output node,
at least one drive signal generator comprises a comparator and a ramp signal generator, and
a drive signal generator comprises a current sensor for sensing the current contribution of the phase to an output current of the converter, and wherein a signal that is indicative of the current contribution of the respective phase is added to the ramp signal of the phase before supplied to the comparator of the phase.

22. The multiphase switching converter of claim 21, wherein each phase circuit comprises a coil of a different inductance.

23. The multiphase switching converter of claim 21, comprising at least one compensation network coupled with the output(s) of the at least one error signal generator.

24. The multiphase switching converter of claim 21, wherein the drive signals of the phases have a different frequency and the switching elements operate at the different frequencies.

* * * * *